Figure 1:
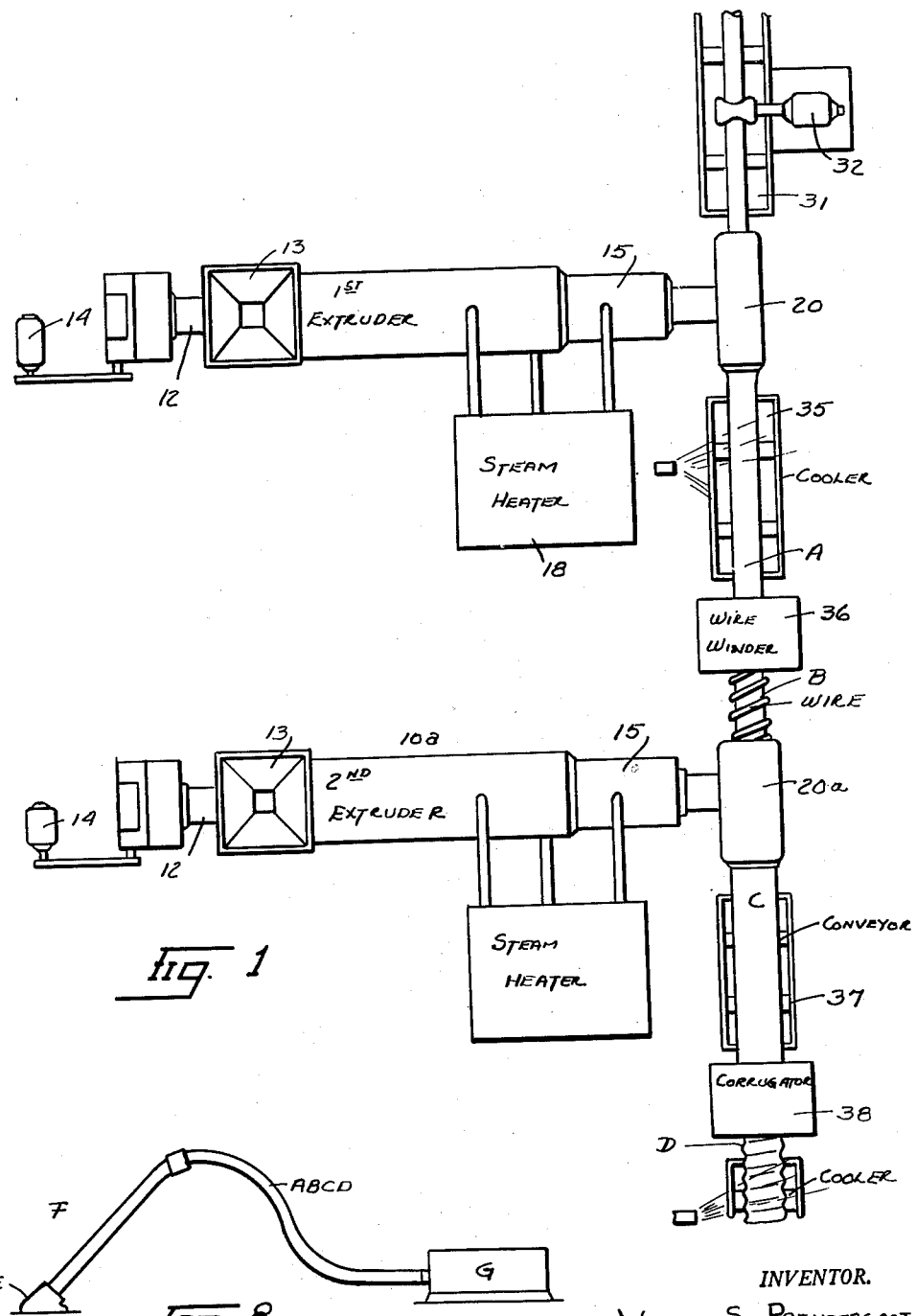

June 27, 1950     W. S. PRENDERGAST     2,513,106
METHOD AND APPARATUS FOR MAKING FLEXIBLE TUBES
Original Filed Feb. 8, 1947     2 Sheets-Sheet 2
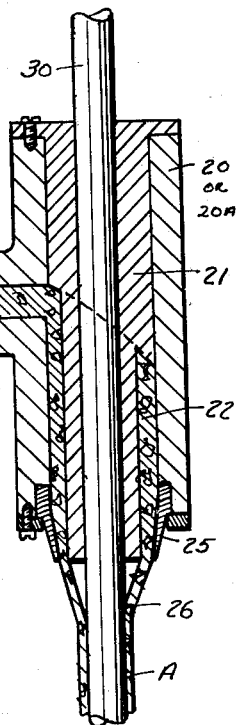
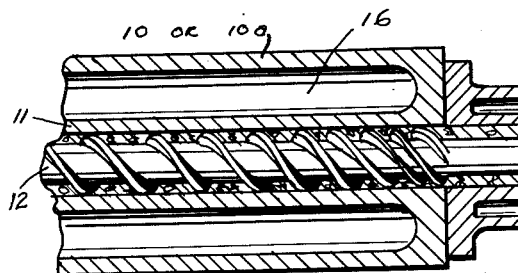
Fig. 2
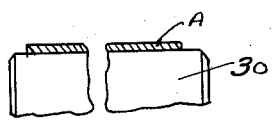
Fig. 3
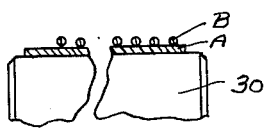
Fig. 4
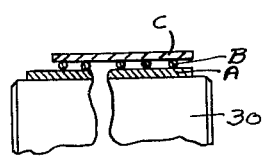
Fig. 5
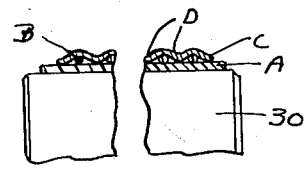
Fig. 6
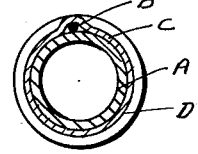
Fig. 7
INVENTOR.
WALTER S. PRENDERGAST
BY
Bates, Teare & McBean
ATTORNEYS

UNITED STATES PATENT OFFICE 2,513,106

METHOD AND APPARATUS FOR MAKING FLEXIBLE TUBES

Walter S. Prendergast, Macedonia, Ohio, assignor to Carter Products Corporation, Cleveland, Ohio, a corporation of Ohio Original application February 8, 1947, Serial No. 727,464. Divided and this application June 11, 1947, Serial No. 753,947

11 Claims. (Cl. 18—14)

This invention is concerned with a method and apparatus for making a reinforced plastic tube suitable for use in vacuum cleaners and other installations where a flexible non-collapsible tube with smooth interior is desired. This application is a division of my application, Ser. No. 727,464, filed February 8, 1947, for a reinforced plastic tube and method and apparatus for making the same.

The tube, as made by my method and apparatus, comprises an inner tube of thermo-plastic material, a helical reinforce of wire surrounding and engaging such inner tube, and an outer tube of thermo-plastic material surrounding the wire helix and corrugated inwardly between coils of the helix to contact with the inner tube and adhere firmly to it. The object of the present invention is to provide for the making of such tube by an efficient extruding process associated with other simple steps.

My method and apparatus are illustrated in the drawings hereof and hereinafter described and the essential novel features are set out in the claims.

In the drawings, Fig. 1 is a diagrammatic plan of my apparatus for making this tube by the method of this invention; Fig. 2 is an enlarged axial section through either of the two tube mills employed in the process; Figs. 3 to 6 inclusive are diagrams illustrating successive stages of the tube as it is built up on the mandrel; Fig. 7 is a cross section of the complete tube; Fig. 8 is a diagrammatic view illustrating the tube in one vacuum cleaner installation.

In Fig. 1, 10 and 10a indicate a pair of plastic extruding machines, each of which is shown in axial section in Fig. 2. Briefly, the extruding machine comprises a hollow barrel 11 (Fig. 2) having a central bore in which is a rotatable screw 12 for forcing tubular plastic material, received from a hopper 13, out of the discharge end of the barrel. Suitable motor mechanism 14 operates to rotate the screw. At its discharge end the barrel is preferably continued by a hollow bonnet 15 surrounding an unthreaded pilot constituting the end portion of the screw. The barrel proper and the bonnet are shown as having annular chambers 16, 17 which may be supplied with steam from suitable heaters, indicated at 18.

Beyond the discharge end of the two bonnets 15 are hollow barrels 20 and 20a similarly constructed and aligning with each other. Each barrel carries an internal tubular plug 21 providing an annular passageway 22 between the exterior of the plug and the barrel. This passageway communicates by a T-extension 23 with the discharge end of the tubing machine. Each barrel 20 or 20a has a converging nozzle 25 leading toward the discharge end of the passageway 22.

It results from the above construction that the hot plastic material extruded by the extruding machine 10 passes into the barrel 20 and emerges in contracted tubular form, as indicated at 26 in Fig. 2. A long straight cylindrical mandrel 30 is inserted through the tubular plug 21 and is forced along the same as the material is extruded, so that the inner layer for complete tube designated A is formed on the traveling mandrel.

In Fig. 1, I have shown at 31 a support for the mandrel and at 32 a motor mechanism for propelling it. After the mandrel emerges from the tubing head 20 carrying the hot plastic tube it proceeds across a suitable cooler shown at 35 in Fig. 1, which may for instance spray water onto the hot tube, and then passes into cooperation with a wire winder 36 of any suitable form which winds a wire around the tube. As the tube on the mandrel is moving forwardly, this winding becomes the helix B.

The mandrel carrying the inner tube and the embracing helix of wire now passes through the head 20a which is similar to the head 20, though having a larger bore in the tubular plug. In passing through this head the outer layer of plastic material is formed about the wire helix and inner tube. The mandrel continues to progress and the composite tube with this outer layer C then passes along a conveyor 37 into coaction with a corrugating device 38, which may comprise one or more rollers engaging the outer tube. This corrugating device serves to divert the outer tube inwardly between the coils of the wire, as indicated at D in Figs. 1 and 6.

The complete tube now passes into the action of a cooler which may be a conveyor 39, which delivers the tube mounted on its mandrel. After this, the finished tube may be cut in proper sections and stripped from the mandrel.

It is to be understood that the mandrels are of considerable length, as most desired for the length of the tube to be formed, and one mandrel follows directly after another. Such following mandrel, advanced by the motor mechanism 32, serves to shove the advance mandrel ahead of it.

When the tube has been completed it is light in weight but very strong, as a perfectly smooth uninterrupted interior well adapted for vacuum cleaner work, and it cannot be collapsed, but may be flexed as desired in use. In Fig. 8, I have illustrated one such use where E indicates a vacuum cleaner nozzle on the end of a tubular handle F to which is attached my composite tube A, B, C, D leading to a suction apparatus G. This illustration of course represents merely one use for the tube.

I may employ for the manufacture of the tube, by this method and apparatus, any suitable thermo-plastic material of such composition and consistency that it may be formed into a tube by the tubing machines and upon cooling will make an effective permanent impervious tube adapted to retain the general satisfactory form given it in the forming operation but flexible in use. As an illustration, however, I may state that I have used satisfactorily vinylchloride as a material for the tube, also vinylchloride copolymerized with other materials such as vinylacetate or vinylformate. The reinforcing wire may be steel or plastic material having sufficient rigidity to prevent collapsing of the tube, while allowing flexure thereof.

I claim:

1. The method of making flexible tubes comprising extruding plastic material in tubular form about a traveling mandrel to make an inner layer, surrounding the inner layer by a reinforce, placing a tubular covering over the reinforce, forcing the outer layer inwardly in regions clearing the reinforce to pocket the reinforce between the layers, and stripping the tube from the mandrel.

2. The method of making flexible tubes comprising forming an inner layer of plastic material about a traveling mandrel, surrounding the inner layer by a reinforce, extruding plastic material in tubular form about the reinforced inner layer to form an outer layer, causing the inner and outer layers to adhere to each other in separated regions to retain the reinforce in position, and stripping the tube from the mandrel.

3. The method of making flexible tubes comprising extruding plastic material of tubular form to make an inner layer, thereafter surrounding the inner layer by a reinforce, extruding plastic material in tubular form about the reinforce to form an outer layer and causing the inner and outer layers to adhere to each other periodically to retain the reinforce in position.

4. The method of making flexible tubes comprising extruding plastic material of tubular form about a traveling mandrel to form an inner layer, surrounding the inner layer by a helical reinforce, extruding plastic material in tubular form about the helical reinforce to form an outer layer, causing the inner and outer layers to adhere to each other between the turns of the reinforce, and stripping the tube from the mandrel.

5. The method of making a flexible reinforced tube comprising extruding thermo-plastic material in tubular form about a traveling mandrel, cooling said layer, placing a reinforce about the exterior of the layer, forming a tubular covering over the reinforce, forcing the outer covering inwardly into contact with the inner layer to position the reinforce between the layers, and stripping the tube from the mandrel.

6. The method of making a flexible reinforced tube having an uninterrupted inner surface comprising extruding thermo-plastic material in tubular form about a traveling cylindrical mandrel, winding a helical coil of wire about the tubular inner layer, extruding a second tubular layer to cause it to cover the helical reinforce, forcing the outer layer inwardly between the coils of the wire into adhering contact with the inner layer, cooling the respective hot layers to form pliant compact members with smooth external surfaces, and stripping the tube from the mandrel.

7. The method of making a flexible reinforced tube comprising extruding thermo-plastic material in tubular form about a traveling mandrel, cooling the layer thus formed as the mandrel progresses, winding a helical coil of wire about the inner tubular layer, extruding a second tubular layer of thermo-plastic material over the inner layer and reinforce, cooling such second layer, corrugating the outer layer inwardly between the coils of the wire and causing it to adhere in such regions to the inner layer, and stripping the tube from the mandrel.

8. An apparatus for making reinforced flexible tubes comprising two extruding machines discharging into aligned hollow heads, means for progressing a succession of mandrels each shoving one ahead of it through the two heads so that the tube formed at the second head covers the tube formed at the first head.

9. An apparatus for making reinforced flexible tubes comprising two extruding machines discharging into aligned hollow heads, means for progressing a mandrel successively through the two heads with the tube formed by the first head being exposed between the heads, means for applying a reinforce to such exposed portion of the tube formed about the mandrel at the first head so that the tube formed at the second head covers the tube formed at the first head and the reinforce thereon.

10. An apparatus for making reinforced flexible tubes comprising means for progressing a cylindrical mandrel in the axial direction, an extruding machine discharging into a hollow head surrounding a mandrel to form a plastic tube about the mandrel, a wire winder adapted to coil a wire in helical form about the advancing inner tube on the mandrel, a second extruding machine having a hollow head adapted to surround the mandrel, the inner tube and the helix of wire, and mechanism for thereafter corrugating the outer tube inwardly against the inner tube while the latter is supported by the mandrel.

11. An apparatus for making flexible reinforced tubes comprising a cylindrical mandrel, mechanism for progressing the same axially of the mandrel, an extruding machine adapted to force thermo-plastic material in heated condition about the mandrel as it advances, a cooling device to cool such inner tube on the mandrel, a winding device adapted to wind a coil of reinforce material about the cooled inner tube on the mandrel, a second extruding machine adapted to deliver an outer tube of thermo-plastic material about the advancing coil on the inner tube on the mandrel, and a corrugating device to force the outer tube inwardly between the coils of the reinforce into contact with the inner tube while the latter is held in cylindrical form on the mandrel.

WALTER S. PRENDERGAST.

REFERENCES CITED

The following references are of record in the file of this patent:

FOREIGN PATENTS

| Number | Country | Date |
| --- | --- | --- |
| 410,313 | Great Britain | May 17, 1934 |